United States Patent
Furmanek et al.

(10) Patent No.: US 12,153,454 B2
(45) Date of Patent: Nov. 26, 2024

(54) SYSTEMS AND METHODS FOR CONTROLLING A VARIABLE GAS VALVE

(71) Applicant: Copeland Comfort Control LP, St. Louis, MO (US)

(72) Inventors: Daniel L. Furmanek, Ballwin, MO (US); Ryan Jensen, St. Louis, MO (US); John F. Broker, Warrenton, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 411 days.

(21) Appl. No.: 17/652,833

(22) Filed: Feb. 28, 2022

(65) Prior Publication Data
US 2023/0273627 A1 Aug. 31, 2023

(51) Int. Cl.
*G05D 7/06* (2006.01)
*F23N 1/00* (2006.01)
(52) U.S. Cl.
CPC .......... *G05D 7/0623* (2013.01); *F23N 1/005* (2013.01); *G05D 7/0635* (2013.01); *F23N 2235/16* (2020.01); *F23N 2235/24* (2020.01)
(58) Field of Classification Search
CPC .... G05D 7/0623; G05D 7/0635; F23N 1/005; F23N 2235/16; F23N 2235/24
USPC ........................................................ 431/89
See application file for complete search history.

(56) References Cited

U.S. PATENT DOCUMENTS

| | | | |
|---|---|---|---|
| 5,950,668 A * | 9/1999 | Baumann | G05B 19/19 137/486 |
| 8,275,484 B2 | 9/2012 | Lorenz et al. | |
| 8,381,760 B2 | 2/2013 | Santinanavat et al. | |
| 8,539,978 B2 | 9/2013 | Santinanavat et al. | |
| 8,752,577 B2 | 6/2014 | Santinanavat et al. | |
| 8,813,776 B2 | 8/2014 | Stark et al. | |
| 9,032,991 B2 | 5/2015 | Broker et al. | |
| 9,038,658 B2 | 8/2015 | Santinanavat et al. | |
| 9,581,331 B2 | 2/2017 | Broker et al. | |
| 2011/0266473 A1* | 11/2011 | Santinanavat | F16K 31/165 251/30.01 |
| 2022/0299238 A1* | 9/2022 | Gullapalli | G05D 7/0635 |

OTHER PUBLICATIONS

Gaberman ("How to Clean Up Noisy Sensor Data With a Moving Average Filter". Maker Pro. Mar. 31, 2020. https://maker.pro/arduino/tutorial/how-to-clean-up-noisy-sensor-data-with-a-moving-average-filter) (Year: 2020).*

* cited by examiner

*Primary Examiner* — Vivek K Shirsat
(74) *Attorney, Agent, or Firm* — Armstrong Teasdale LLP

(57) ABSTRACT

A gas valve assembly includes a gas valve and a control circuit. The gas valve is configured for variably controlling a flow of gas through the gas valve assembly. The control circuit includes a controller programmed to determine a first setting for the gas valve in response to a received commanded flow, adjust the first setting to a second setting based on a measured temperature when the measured temperature is one that may induce changes to the flow of gas through the gas valve assembly, and control the gas valve based on the second setting.

18 Claims, 5 Drawing Sheets

SYSTEMS AND METHODS FOR CONTROLLING A VARIABLE GAS VALVE

FIELD

The field of the disclosure relates gas powered appliances and systems, and more particularly, to systems and methods for controlling a variable gas valve.

BACKGROUND

Gas powered furnaces and appliances typically include a gas valve that controls the provision of gas to a burner. Some such valves are controllable beyond simply on or off and allow the flow of gas to be varied to many different levels between maximum flow and no flow. At least some variable valves may be affected by changes in temperature and the temperature may cause the output pressure from the valve to differ from what is expected.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a gas valve assembly includes a gas valve and a control circuit. The gas valve is configured for variably controlling a flow of gas through the gas valve assembly. The control circuit includes a controller programmed to determine a first setting for the gas valve in response to a received commanded flow, adjust the first setting to a second setting based on a measured temperature when the measured temperature is one that may induce changes to the flow of gas through the gas valve assembly, and control the gas valve based on the second setting.

Another aspect is a gas-powered heating system including a burner, a system controller, and a gas valve assembly. The gas valve assembly is coupled between a gas source and the burner. The gas valve assembly includes a gas valve to variably control a flow of gas through the gas valve assembly, and a control circuit including a controller communicatively coupled to the system controller. The controller is programmed to receive a commanded gas flow from the system controller, determine a first setting for the gas valve in response to the received commanded flow, adjust the first setting by an adjustment amount to a second setting based on a measured temperature when the measured temperature is one that may induce changes to the flow of gas through the gas valve assembly, and control the gas valve based on the second setting.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

For conciseness, examples will be described with respect to a gas powered furnace. However, the methods and systems described herein may be applied to any suitable system or appliance that uses a stepper-motor regulated gas valve including an agricultural heater, a gas fireplace, a gas oven, and the like.

Figure 1:
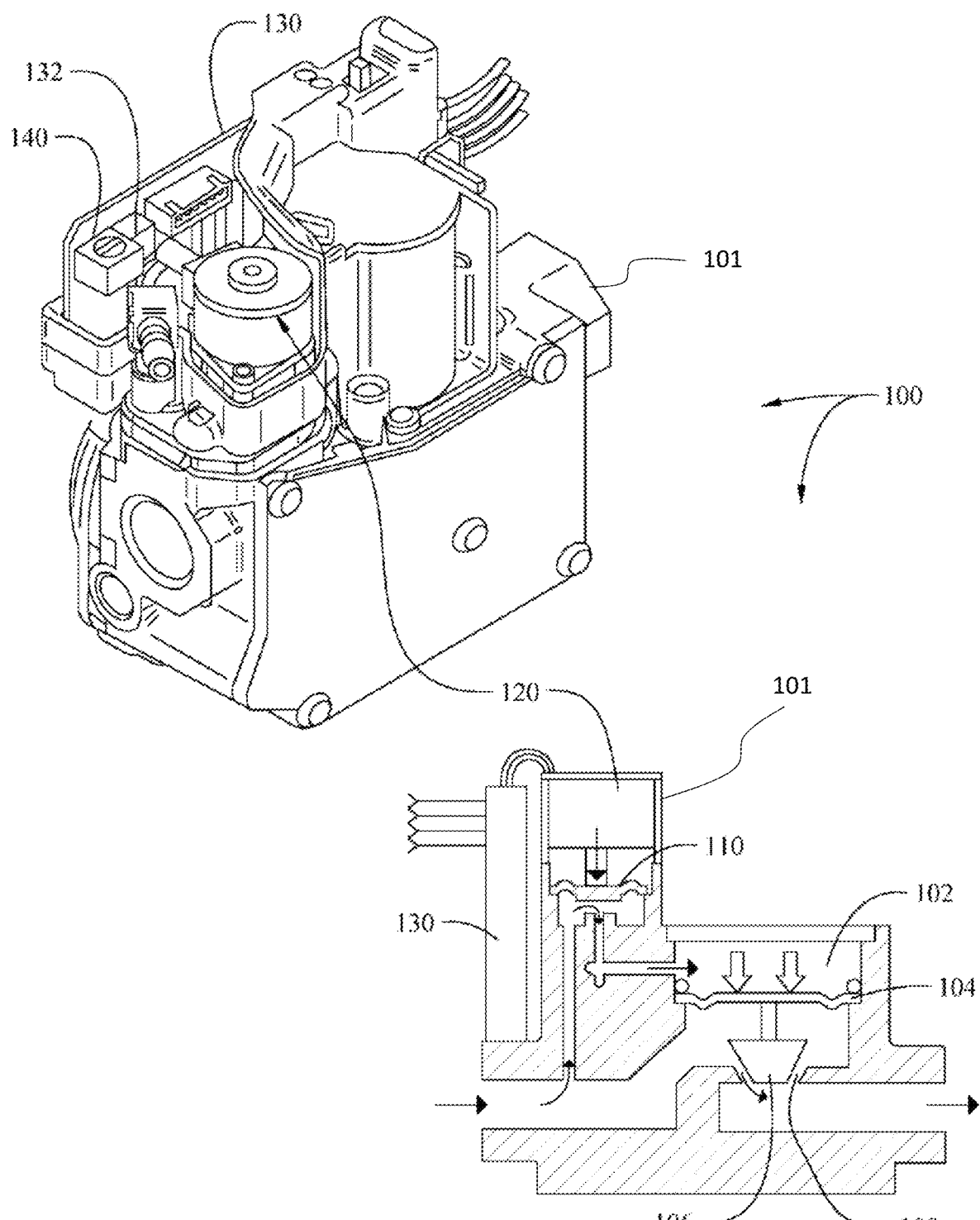
FIG. 1 is a perspective view and a schematic cut-away view of one embodiment of a stepper-motor regulated gas valve according to the present disclosure.

FIG. 1 shows an example stepper-motor regulated gas valve assembly 100. The stepper-motor regulated gas valve assembly 100 includes a gas valve 101 and a controller 130. The gas valve 101 includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The gas valve 101 further includes a servo-regulator diaphragm 110, which is configured to regulate fluid flow to the main diaphragm chamber 102. The servo-regulator diaphragm therefore controls the fluid pressure applied to the main diaphragm, to control the rate of fuel flow through the valve opening 108. The gas valve 101 also includes a stepper motor 120 configured to move in a stepwise manner to displace the servo-regulator diaphragm 110, for regulating fluid flow to the diaphragm chamber 102 to thereby regulate the rate of fuel flow through the valve 106.

The example accordingly provides for stepper-motor control over the extent of opening of the valve 108, to provide modulated fuel flow operation. The gas valve 100 is governed by a stepper motor 120, rather than a voice coil operator that is typically used in modulating controls for modulating the position of a valve. The typical modulating valve employing a voice coil operator is driven by a milliamp signal ranging from 0 to 180 milliamps, which causes the voice coil to move a distance that is proportional to the amount of milliamps conducted in the coil. Modulating furnaces typically have a furnace controller that determines the extent of heating operation required, and generates a milliamp signal corresponding to the desired degree of heating, to provide a corresponding degree of fuel flow. For example, a typical modulating furnace controller may generate a 180 milliamp signal where maximum heating capacity operation is desired, and may generate a 20 milliamp signal where minimum heating operation is desired. However, such a heating demand signal is not applicable to a stepper-motor operator, which is displaced based on a required number of steps.

The stepper-motor regulated gas valve assembly 100 includes a controller or control circuit 130 configured to receive an input control signal, from which a reference value of between 0 and 5 volts is obtained. The control circuit 130 is configured to determine a select motor step value that corresponds to the obtained reference value, and to move the stepper-motor 120 a number of steps corresponding to the selected motor step value, which displaces the servo-regulator diaphragm 110 and thereby controls the rate of fuel flow through the valve opening 108.

Figure 2:
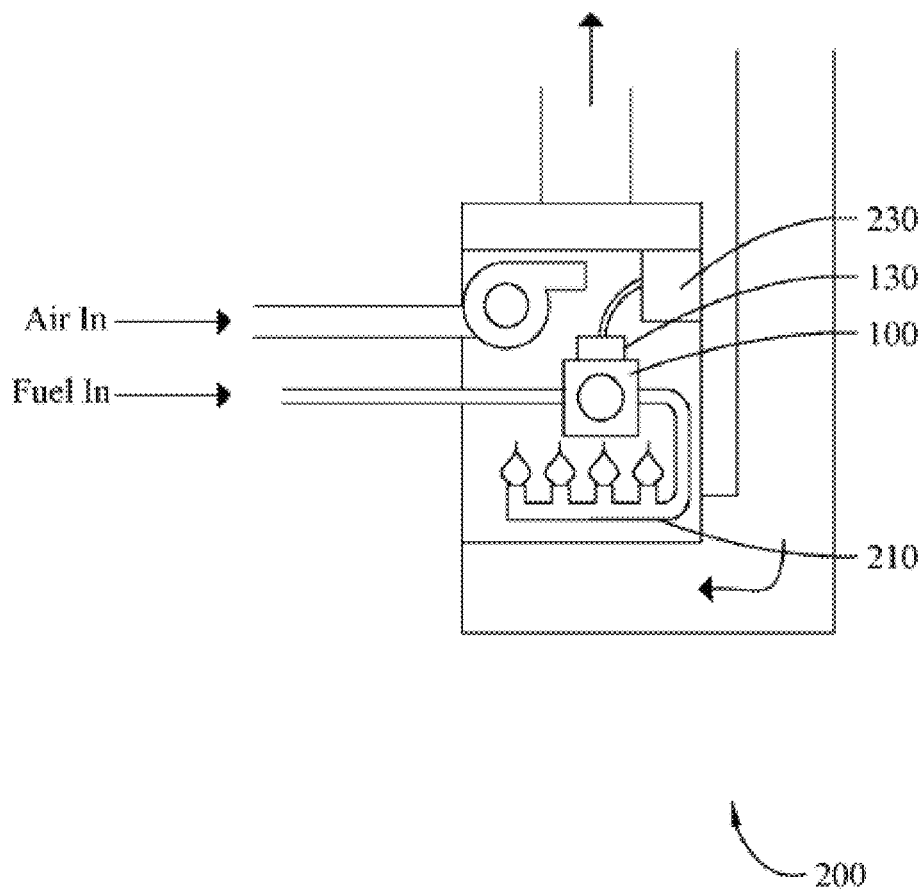
FIG. 2 is an example fuel-fired heating system that is supplied with fuel by the stepper motor regulated gas valve shown in FIG. 1.

The stepper-motor regulated gas valve assembly 100 may be included within a fuel-fired heating system 200 that includes a burner 210 that is supplied with fuel by the stepper-motor regulated gas valve assembly 100, as shown in FIG. 2. The fuel-fired heating system 200 further includes a furnace controller 230 that controls operation of the system 200, including communicating with the control circuit 130 for controlling the operation of the stepper-motor regulated gas valve assembly 100. The furnace controller 230 may also be referred to as a system controller. It should be understood that the stepper-motor regulated gas valve assembly 100 utilizes a set of motor step values that correspond to a plurality of positions of the stepper motor 120 for adjusting the regulator, which positions range between a closed no-flow position to a 100% full capacity position. The stepper-motor regulated gas valve assembly 100 may be employed in combination with a burner 210 that is supplied with fuel by the stepper-motor regulated gas valve assembly 100, and a furnace controller 230 in communication with the control circuit 130 for controlling the operation of the stepper-motor regulated gas valve assembly 100.

Figure 3:
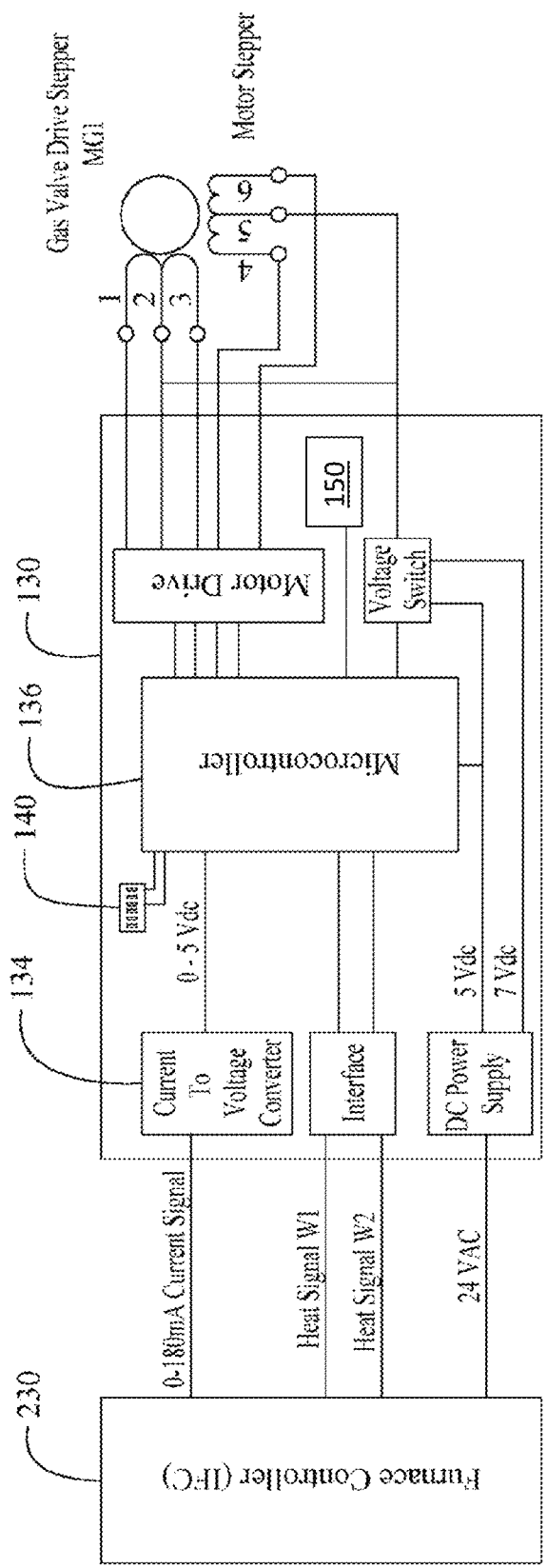
FIG. 3 is an example control circuit for use in connection with the stepper-motor regulated gas valve system shown in FIG. 1.

An example control circuit 130 for use with the stepper-motor regulated gas valve assembly 100 is shown in FIG. 3. The control circuit 130 includes a controller 136 in communication with a current to voltage converter circuitry 134 that converts a command from the furnace controller 230 (also sometimes referred to as an integrated furnace controller) for a particular amount of flow (e.g., a requested fuel level) to a reference signal. In the example, the controller is a microcontroller 136 including a processor and memory (not shown). In other embodiments, the controller 136 includes a central processing unit, microprocessor, reduced instruction set circuit (RISC), application specific integrated circuit (ASIC), logic circuit, or any other circuit or processor capable of executing the functions described herein, and random access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), or any other suitable memory. Although the example control circuit 130 receives heat signal W1 and heat signal W2 from the furnace controller 230, other embodiments do not provide the heat signal W1 and heat signal W2 to the control circuit 130.

In the example, the command is a milliamp signal that ranges from 0 to 180 milliamps, and the reference signal is a 0 to 5 volt (direct current) reference signal. The milliamp signal from the furnace controller 230 is a command for a particular amount of flow from the stepper-motor regulated gas valve assembly 100, such as 100% flow, 90% flow, or the like. In the example stepper-motor regulated gas valve assembly 100, the control 130 receives an input control signal that is a milliamp signal in the range of from 0 to 180 milliamps. The control circuit 130 is configured to convert the received signal from a value of between 0 and 180 milliamps to a corresponding reference value of between 0 and 5 volts. In other embodiments, the command is a 0 to 20 milliamp signal or a 4 to 20 milliamp signal that is converted to a corresponding reference value of between 0 and 5 volts. In some embodiments, the command is a 0-10 volt signal or a 2-10V signal that Is converted to a corresponding reference value of between 0 and 5 volts. In still other embodiments, the control circuit 130 for the stepper-motor regulated gas valve assembly 100 may also be configured to convert use a pulse width modulated signal (e.g., a 0-5 volt PWM signal) either directly as the reference signal or by conversion to a corresponding 0 to 5 volt reference signal. In still other embodiments, the furnace controller 230 communicates with the control circuit 130 by directly providing the 0 to 5 volt reference signal, directly providing a reference signal using serial communication, or directly providing a reference signal using any suitable wired or wireless communication protocol. Wireless communication may include a radio frequency (RF), Bluetooth®, Wi-Fi, a ZigBee®, near field communication (NFC), infrared (IR), and/or any other device and communication protocol for wireless communication. (Bluetooth is a registered trademark of Bluetooth Special Interest Group of Kirkland, Washington; ZigBee is a registered trademark of the ZigBee Alliance of San Ramon, California) Wired communication may include any suitable wired communication protocol for direct communication including, without limitation, USB, RS232, I2C, SPI, analog, and proprietary I/O protocols. Moreover, in some embodiments, the wired communication may be performed using a wired network adapter allowing communication through a network, such as the Internet, a local area network (LAN), a wide area network (WAN), a mesh network, and/or any other network.

The reference signal value is used to determine a motor step value, which is used to determine the number of steps the motor must turn or move to set the servo-regulator diaphragm 110 to the requested fuel level. The stepper motor gas valve 100 uses the select motor step value to drive the stepper-motor 120 in a step-wise manner, to the desired stepper motor position, which causes the stepper-motor 120 to displace the servo-regulator diaphragm 110 the desired distance and thereby regulate the output of the valve.

The control circuit 130 employs a first look-up table having a set of motor step values, which are used to determine the appropriate number of steps the stepper motor 120 must move. The first look-up table is stored in a memory device, such as the memory of the microcontroller 136. In other embodiments, the first look-up table is stored in a memory device separate from the microcontroller 136. The first look-up table includes a set of motor step values that correspond to a number of reference values spanning the range of between 0 and 5 volts, wherein the control circuit 130 is configured to determine an appropriate motor step amount by selecting a motor step value from the look up table that corresponds to the reference value obtained from the input control signal. In other embodiments, the furnace controller 230 determines the appropriate number of motor steps in a similar manner to that described for the control circuit 130, and the furnace controller sends a command for a particular number of steps.

Figure 4:
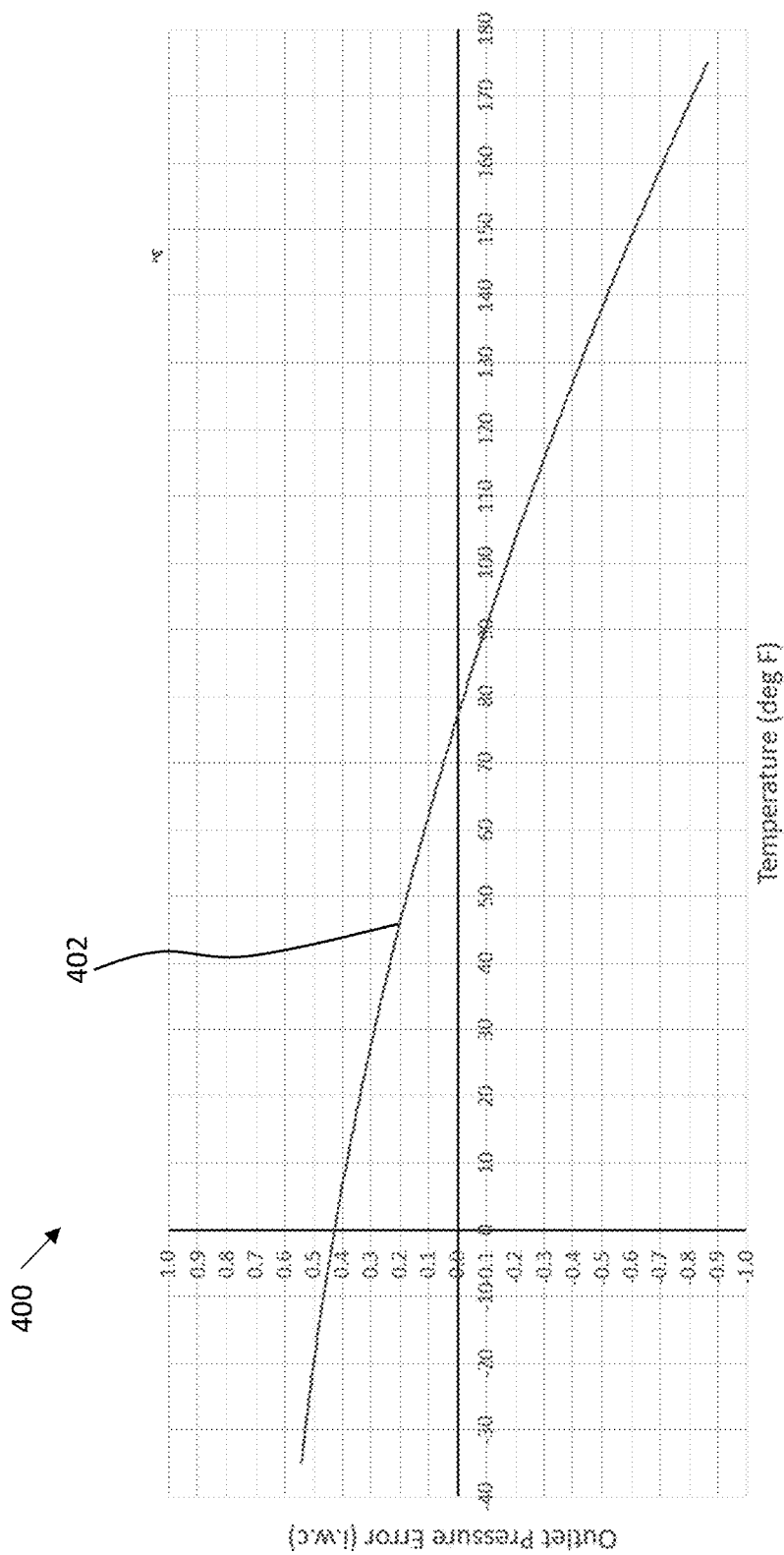
FIG. 4 is a graph of the outlet pressure error for the stepper-motor regulated gas valve system shown in FIG. 1 as a function of ambient temperature.

The ambient temperature around the stepper-motor regulated gas valve assembly 100 can affect the flow through the stepper-motor regulated gas valve assembly 100. That is, the actual flow through the stepper-motor regulated gas valve assembly 100 (e.g., the outlet pressure) may not be the same as the expected flow through the stepper-motor regulated gas valve assembly 100. Without being limited to any particular theory or cause, this error may be caused for example by one or more parts of the gas valve 101 expanding and contracting with changing temperatures. FIG. 4 is a graph 400 of an example error curve 402 for the stepper-motor regulated gas valve assembly 100. In the graph, the error curve shows the error in outlet pressure in inches of water column (IWC) as a function of ambient temperature in degrees Fahrenheit around the stepper-motor regulated gas valve assembly 100. Because the stepper-motor regulated gas valve assembly 100 does not include an outlet pressure sensor, the control circuit 130 does not know what the outlet pressure is and cannot adjust the flow using feedback from such a pressure sensor. The control circuit 130 (and specifically the microcontroller 136) is configured to compensate for temperature based error in the actual flow through the stepper-motor regulated gas valve assembly 100 based on a measured temperature. In the example embodiment, the control circuit 100 includes a temperature sensor 150 to detect the ambient temperature around the stepper-motor regulated gas valve assembly 100. In other embodiments, the temperature sensor is mounted on the gas valve 101, on the furnace controller 230, or in any other suitable location. In this example, the temperature sensor 150 is a thermistor, but other embodiments include any other suitable sensor for measuring temperature.

The control circuit 130 also includes a dip switch for adjusting the number of steps taken by the stepper-motor 120. The dip switch may be a linear six position dip switch 140 as depicted in FIG. 2, or a rotary dip switch 140 and two-position jumper 132 as shown in FIG. 1. The dip switch position or setting is used to add or subtract a number of steps, such as increasing the number of steps to switch from natural gas to liquid propane gas. Still other embodiments do not include or do not use the dip switch 140, and similar adjustments may be made communicated to the control circuit 130 by the furnace controller 230, or by any other suitable input means (including by wired or wireless communication from a remote computing device such as a mobile phone, a tablet computer, a laptop computer, or the like).

To compensate for temperature caused error, the microcontroller 136 includes an error correction look-up table that contains the adjustments needed to be made to the steps determined without reference to temperature. That is, in response to the command signal from the furnace controller 230, the microcontroller will first look up in a first look-up table how many steps to be taken by the stepper-motor 120 to meet the outlet pressure commanded by the command signal. Next the microcontroller 136 will determine the temperature measured by the temperature sensor 150. In some embodiments, the microcontroller periodically measures the temperature regardless of whether or not it has received a command from the furnace controller, and determining the temperature at this point involves retrieving the last measured temperature or an average of several previously measured temperatures (e.g., an average of the last five temperature readings), or the like. The microcontroller 136 will then lookup the adjustment needed for the determined temperature in the error correction look-up table, and will adjust the number of steps from the first look-up table accordingly. For example, if the first look-up table indicates one-hundred steps clockwise are needed in response to a particular command from the furnace controller 230 and the second look-up table indicates for the determined temperature the outlet pressure will be wrong by five steps clockwise, the microcontroller 136 drives the stepper-motor 120 ninety-five steps clockwise. The error correction look-up table may store the error correction data in terms of steps and direction for each temperature, in terms of outlet pressure error for each temperature, or in any other suitable terms. If the data is stored in terms of outlet pressure error in IWC for each temperature, the microcontroller 136 is also programmed to know how the outlet pressure change in IWC for each step of the stepper-motor 120 in order to determine how many steps need to be changed to offset the temperature induced error.

In still other embodiments, the temperature error correction is included in the first look-up table. In such embodiment, the first look-up table includes the steps needed for each demand at each temperature. Thus, the microcontroller 136 would receive a command signal demanding a particular flow, determine the current temperature, and look up the number of steps to achieve the commanded flow at the current temperature. Such embodiments may reduce the number of steps to be taken by the microcontroller 136, but may preclude the ability to selectively disable temperature correction, which is possible with embodiments using a separate error correction look-up table.

The error correction look-up table may be created using any suitable measurement techniques, whether experimental or theoretical. In the example embodiment, the error correction look-up table is created by measuring the outlet pressure of multiple copies of the same stepper-motor regulated gas valve assembly 100 at different steps and different controlled temperatures and comparing it to the expected outlet pressure for each temperature and number of steps to determine the amount of error (if any) for each temperature across a range of temperature. The errors for each different gas valve 100 are then averaged and the averaged errors are used to create the error correction look-up table. Alternatively, the errors may be theoretically calculated and used to create the error correction look-up table. In still other embodiments, each individual stepper-motor regulated gas valve assembly 100 may be tested as described above and the error measurements for each stepper-motor regulated gas valve assembly 100 may be used to create an error correction look-up table specific to that particular stepper-motor regulated gas valve assembly 100.

In the real world, the temperature of the stepper-motor regulated gas valve assembly 100 may not always be equal to the ambient temperature around the stepper-motor regulated gas valve assembly 100. As the ambient temperature around the stepper-motor regulated gas valve assembly 100 changes, the temperature of the stepper-motor regulated gas valve assembly 100 will change, but it will generally lag behind the ambient temperature until the ambient temperature holds steady long enough for the stepper-motor regulated gas valve assembly 100 temperature to reach the same temperature. If the error-correction look-up table is based on the temperature of the stepper-motor regulated gas valve assembly 100, the table may at times (e.g., when the ambient temperature is changing or recently changed) provide incorrect values for the error correction if the ambient temperature is used to determine the correction. Thus, the microcontroller 136 is programmed in some embodiments to slow down the temperature correction using a low pass filter.

To perform the low pass filtering of the temperature, the temperature is measured periodically even when there is no command for operation from the furnace controller 230. The first measured temperature is stored in a temperature variable to be used for control of the stepper-motor regulated gas valve assembly 100 when a command is received from the furnace controller 230. If the next periodic temperature measurement is the same, the temperature variable will remain the same. If the next periodic temperature measurement is different, a value between the first temperature measurement and the next periodic temperature measurement (inclusive) will be stored as the temperature variable.

The value to be stored as the temperature variable is determined to avoid any large, rapid changes in temperature. Any suitable technique may be used to slow down the temperature change used for control as compared to the temperature change of subsequent measurements. The value may, for example, be limited to no more than a predetermined change per a predetermined time. If the next periodic measurement is less than or equal to the predetermined change more/less than the last stored temperature variable, the next periodic measurement is stored as the temperature variable. If the next periodic measurement is more than the predetermined change more/less than the last stored temperature variable, the temperature variable is increased/decreased by only the predetermined change, and the process repeats for subsequent measurements.

One example method of filtering the temperature measurement to avoid rapid changes in temperature will be described. In this method degF_temp is a variable representing latest temperature measured by the temperature sensor or the latest average of a series of temperature measurements. Beta is a variable that is set at 32, but different values may be used to change the response of the filter. Lp_filter_temp is a variable updated after each temperature lookup. When first started:

$$Lp\_filter\_temp = (degF\_temp + 40) * Beta \quad (1)$$

On all subsequent degF_temp lookups, the Lp_filter_temp is set to:

$$Lp\_filter\_temp = Lp\_filter\_temp - [(Lp\_filter\_temp - (degF\_temp + 40) * Beta)/Beta] \quad (2)$$

and the division is truncated. The remained need not be considered. The remainder of Lp_filter_temp/Beta is calculated. A variable degF_filtered_temp is set to:

$$degF\_filtered\_temp = Lp\_filter\_temp/Beta - 40 \quad (3)$$

If the remainder of Lp_filter_temp/Beta is greater than or equal to 16, one is added to degF_filtered_temp. The degF_filtered_temp value is the temperature value used to determine how many steps of adjustment are needed to correct for the temperature.

Figure 5:
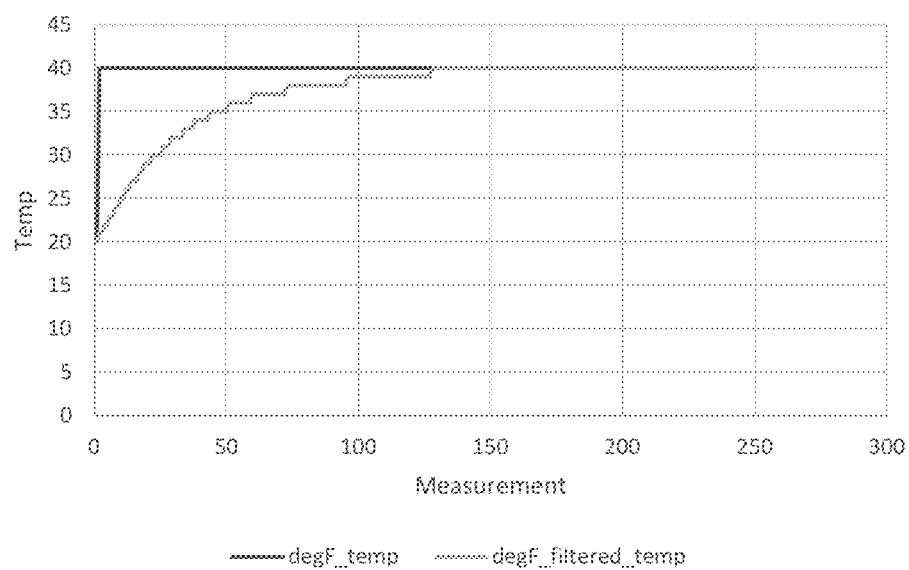
FIG. 5 is a graph of a change in measured temperature and a variable for compensating control of the stepper-motor regulated gas valve system shown in FIG. 1 for temperature as a function of measurement cycles.

Table 1 below is a table of degF_temp, Lp_filter_temp, the remainder of Lp_filter_temp/Beta, and degF_filtered_temp as described above over fifty temperature measurements. As can be seen, there is a step change from twenty degrees to forty degrees between the first and second measurements and the temperature remains forty degrees thereafter. The degF_filtered_temp can be seen to slowly increase. Although not shown in the table, degF_filtered_temp will reach forty degrees after about the $128^{th}$ cycle. FIG. 5 is a graph of the measured temperature (degF_temp) and the calculated degF_filtered_temp over 250 measurements.

TABLE 1

| deg F._temp | Lp_filter_temp | Remainder of Lp_filter_temp/Beta | deg F._filtered_temp |
|---|---|---|---|
| 20 | 1920 | 0 | 20 |
| 40 | 1940 | 20 | 21 |
| 40 | 1959 | 7 | 21 |
| 40 | 1977 | 25 | 22 |
| 40 | 1995 | 11 | 22 |
| 40 | 2012 | 28 | 23 |
| 40 | 2029 | 13 | 23 |
| 40 | 2045 | 29 | 24 |
| 40 | 2061 | 13 | 24 |
| 40 | 2076 | 28 | 25 |

TABLE 1-continued

| deg F._temp | Lp_filter_temp | Remainder of Lp_filter_temp/Beta | deg F._filtered_temp |
|---|---|---|---|
| 40 | 2091 | 11 | 25 |
| 40 | 2105 | 25 | 26 |
| 40 | 2119 | 7 | 26 |
| 40 | 2132 | 20 | 27 |
| 40 | 2145 | 1 | 27 |
| 40 | 2157 | 13 | 27 |
| 40 | 2169 | 25 | 28 |
| 40 | 2181 | 5 | 28 |
| 40 | 2192 | 16 | 29 |
| 40 | 2203 | 27 | 29 |
| 40 | 2214 | 6 | 29 |
| 40 | 2224 | 16 | 30 |
| 40 | 2234 | 26 | 30 |
| 40 | 2244 | 4 | 30 |
| 40 | 2253 | 13 | 30 |
| 40 | 2262 | 22 | 31 |
| 40 | 2271 | 31 | 31 |
| 40 | 2280 | 8 | 31 |
| 40 | 2288 | 16 | 32 |
| 40 | 2296 | 24 | 32 |
| 40 | 2304 | 0 | 32 |
| 40 | 2312 | 8 | 32 |
| 40 | 2319 | 15 | 32 |
| 40 | 2326 | 22 | 33 |
| 40 | 2333 | 29 | 33 |
| 40 | 2340 | 4 | 33 |
| 40 | 2346 | 10 | 33 |
| 40 | 2352 | 16 | 34 |
| 40 | 2358 | 22 | 34 |
| 40 | 2364 | 28 | 34 |
| 40 | 2370 | 2 | 34 |
| 40 | 2375 | 7 | 34 |
| 40 | 2380 | 12 | 34 |
| 40 | 2385 | 17 | 35 |
| 40 | 2390 | 22 | 35 |
| 40 | 2395 | 27 | 35 |
| 40 | 2400 | 0 | 35 |
| 40 | 2405 | 5 | 35 |
| 40 | 2409 | 9 | 35 |
| 40 | 2413 | 13 | 35 |

Example embodiments of valves, gas-powered furnace systems, valve controllers, and furnace controllers are described above in detail. The system and controller are not limited to the specific embodiments described herein, but rather, components of the system and controller may be used independently and separately from other components described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A gas valve assembly comprising:
a gas valve configured for variably controlling a flow of gas through the gas valve assembly;
a control circuit including a controller programmed to:
periodically measure an ambient temperature around the gas valve assembly;
determine a first setting for the gas valve in response to a received commanded flow;
adjust the first setting to a second setting based on a measured temperature when the measured temperature is one that may induce changes to the flow of gas through the gas valve assembly, wherein the measured temperature is based on the periodically measured ambient temperature; and
control the gas valve based on the second setting.

2. The gas valve assembly of claim 1, wherein the gas valve includes a stepper motor operable to control the flow of gas through the gas valve assembly.

3. The gas valve assembly of claim 2, wherein the controller is programmed to determine a first number of steps of the stepper motor as the first setting, increase or decrease the first number of steps to a second number of steps to adjust the first setting to the second setting, and actuate the stepper motor the second number of steps to control the gas valve based on the second setting.

4. The gas valve assembly of claim 1, wherein further comprising a temperature sensor to measure the ambient temperature.

5. The gas valve assembly of claim 4, wherein the temperature sensor is mounted to the control circuit.

6. The gas valve assembly of claim 4 wherein the temperature sensor is mounted to the gas valve.

7. The gas valve assembly of claim 1, wherein the controller is programmed to average a predetermined number of the periodically measured ambient temperatures for use as the measured temperature.

8. The gas valve assembly of claim 1, wherein the controller is programmed to apply a filter to the periodically measured ambient temperatures and use the filtered periodically measured ambient temperatures as the measured temperature.

9. The gas valve assembly of claim 8, wherein the filter is configured to slow down changes in the measured temperature caused by changes in the periodically measured temperatures.

10. The gas valve assembly of claim 1, wherein the controller is programmed to:
determine the first setting for the gas valve by retrieving the first setting from a first look-up table; and
adjust the first setting to the second setting by retrieving an adjustment amount for the measured temperature from an error correction look-up table and adjusting the first setting by the adjustment amount.

11. A gas-powered heating system comprising:
a burner;
a system controller;
a temperature sensor to measure an ambient temperature; and
a gas valve assembly coupled between a gas source and the burner, the gas valve assembly including:
a gas valve to variably control a flow of gas through the gas valve assembly; and
a control circuit including a controller communicatively coupled to the system controller, the controller programmed to:
periodically measure an ambient temperature around the gas valve assembly with the temperature sensor;
receive a commanded gas flow from the system controller;
determine a first setting for the gas valve in response to the received commanded flow;
adjust the first setting by an adjustment amount to a second setting based on a measured temperature when the measured temperature is one that may induce changes to the flow of gas through the gas valve assembly, wherein the measured temperature is based on the periodically measured ambient temperature; and
control the gas valve based on the second setting.

12. The gas-powered heating system of claim 11, wherein the gas valve includes a stepper motor operable to control the flow of gas through the gas valve assembly, and the first setting comprises a first number of steps of the stepper motor and the second setting comprise a second number of steps of the stepper motor.

13. The gas-powered heating system of claim 11, wherein the temperature sensor is positioned on the gas valve assembly.

14. The gas-powered heating system of claim 11, wherein the temperature sensor is positioned on the system controller.

15. The gas-powered heating system of claim 11, wherein the controller is programmed to average a predetermined number of the periodically measured ambient temperatures for use as the measured temperature.

16. The gas-powered heating system of claim 11, wherein the controller is programmed to apply a filter to the periodically measured ambient temperatures and use the filtered periodically measured ambient temperatures as the measured temperature.

17. The gas-powered heating system of claim 16, wherein the filter is configured to slow down changes in the measured temperature caused by changes in the periodically measured temperatures.

18. The gas-powered heating system of claim 11, wherein the controller is programmed to:
determine the first setting for the gas valve by retrieving the first setting from a first look-up table; and
adjust the first setting to the second setting by retrieving an adjustment amount for the measured temperature from an error correction look-up table and adjusting the first setting by the adjustment amount.

* * * * *